UNITED STATES PATENT OFFICE.

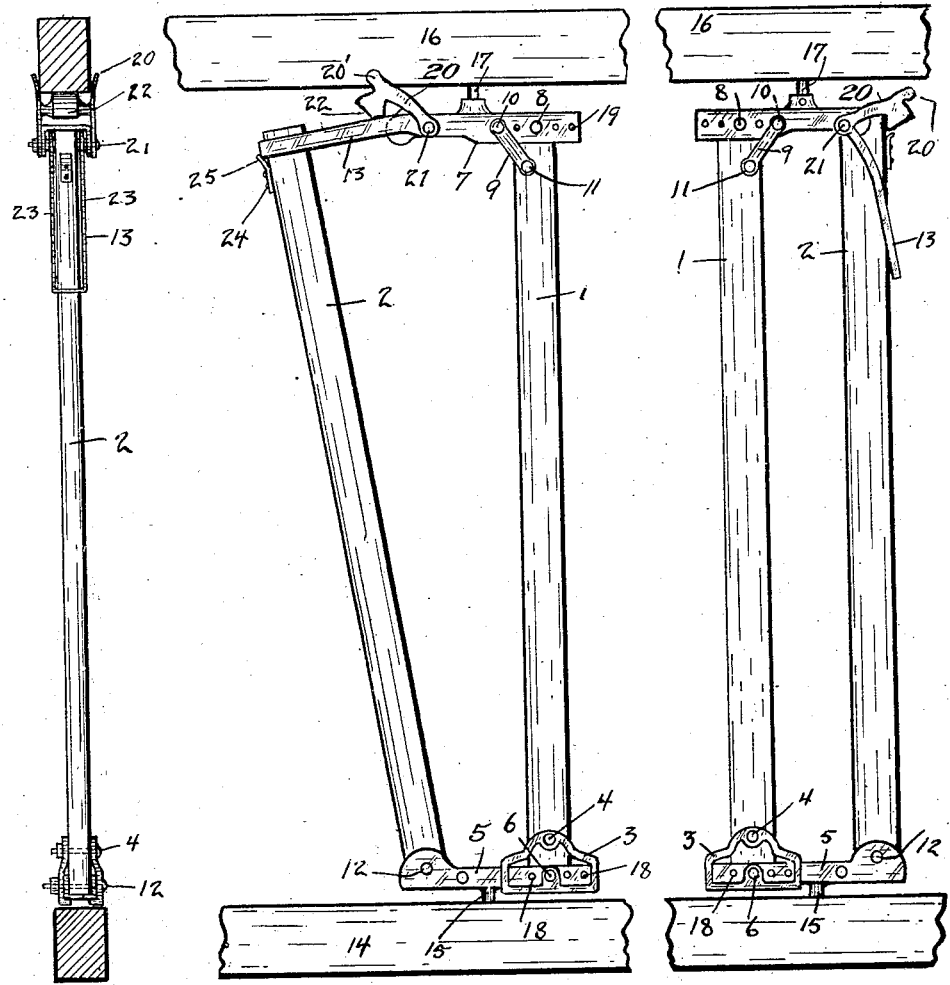

WILLIAM GUTENKUNST, OF MILWAUKEE, WISCONSIN.

CATTLE-STANCHION.

No. 884,148. Specification of Letters Patent. Patented April 7, 1908.

Application filed October 18, 1906. Serial No. 339,453.

*To all whom it may concern:*

Be it known that I, WILLIAM GUTENKUNST, a citizen of the United States, residing at Milwaukee, county of Milwaukee, and State of Wisconsin, have invented new and useful Improvements in Cattle-Stanchions, of which the following is a specification.

My invention relates to improvements in that class of cattle stanchions in which the cattle retaining bars are revolubly connected at their respective ends with a supporting frame, and it pertains more especially, first, to the construction and arrangement of the gravity latch and loop which are adapted to engage and lock the upper end of the pivotally supported stanchion bar when it is closed, while said loop is adapted to hold and guide the pivotal bar when disengaged from the latch, said loop being adapted to serve as a means of disengaging the latch from the upper end of said pivotal bar preparatory to opening the stanchion bar.

My invention pertains, second, to the device for adjusting the fixed stanchion bar nearer to or further from the pivotal bar as may be required for cattle of different sizes.

My invention is further explained by reference to the accompanying drawings, in which, Figure 1 represents a front view of the stanchion in its open position. Fig. 2 is a front view of the stanchion in its closed position, and Fig. 3 is a side view of the stanchion in its open position.

Like parts are identified by the same reference figures throughout the several views.

1 represents the stationary stanchion bar and 2 the pivotal stanchion bar. Bar 1 is rigidly affixed at its lower end to the bracket 3 by bolt 4 and said bar and bracket are adjustably secured to the revoluble bracket 5 by the bolt 6, said bar 1 being affixed at its upper end to the bracket 7 by the bolt 8, brace bar 9 and brace retaining bolts 10 and 11, while the bar 2 is pivotally connected at its lower end to the revoluble bracket 5 by the bolt 12 and is movably connected at its upper end to the bracket 7 by and within the loop 13. The bracket 5 is revolubly connected with the lower horizontal supporting bar 14 by the trunnion 15, while the bracket 7 is revolubly connected with the upper bar 16 by the trunnion 17. The bracket 5 is provided with a plurality of holes 18 for the reception of the adjusting bolt 6, whereby, by removing said bolt, the lower end of said stanchion bar 1 and bracket 3 may be adjusted nearer to or further from the stanchion bar 2 to conform to the size of the cattle with which such stanchions are used. When said stanchion bar has been adjusted it is secured at such point of adjustment by inserting the bolt 6 through one of the holes 18 of the series formed in said bracket 5, whereby the lower end of said stanchion bar and the bracket 3 connected therewith are securely retained in place, while the upper end of said stanchion bar 1 is simultaneously adjusted by removing the bolt 8 when the upper end of the bar 1 is moved toward the right or left to correspond with the adjustment of the lower end, when it is secured at such point of adjustment by again inserting the bolt 8 through one of the series of apertures 19 which registers with the central aperture in the upper end of the bar 1 when thus adjusted, whereby it is obvious that the stanchion bar 1 may be readily adjusted at both its upper and lower ends as required for the purposes stated. It will be understood that when thus adjusting the upper end of the stationary stanchion bar 1 to register with one of the apertures 19, the bolt 10 is also removed, and the upper end of the brace bar 9 and said bolt 10 are also adjusted toward the right and left to conform to the adjustment of said stanchion bar when the bolt 10 is again inserted through the aperture of said brace bar and the aperture in the bracket registering therewith, when said brace bar and bolts coöperate with the bolt 8 in holding the upper end of said stanchion bar in place.

The loops 13 and the bar retaining latch 20 are pivotally connected with the bracket 7 by the same pivotal bolt 21. The latch 20 is provided with a central lug 22 which tapers outwardly and upwardly from the supporting bracket 7, whereby as the free end of said bar 2 is brought in contact with said lug 22, said latch will be thrown upward until the bar 2 has passed beneath said lug when said latch will drop of its own gravity, and the lug of said latch will engage the upper end of said bar. The latch 20 is preferably pivoted to the outer surface of the supporting bracket 7, while the loop 13 is preferably pivoted to the inner surface of said bracket, whereby as said loop 13 is raised by the manual act of a person, the respective sides 23 of said loop will be brought to bear against the front end of said latch upon the respective side of the lug 22, whereby said latch will be raised and thrown out of engagement with said stanchion bar when said stanchion bar will be free to move from the vertical position shown in Fig. 2 to the inclined position shown in Fig. 1.

24 is a loop supporting stop which is rigidly affixed to the outer edge of the bar 2 and its upper end is inclined outward at an angle to the edge of said bar, whereby when said loop 13 is raised, said loop will drop into engagement with the upper end of said stop and will be thus retained while the stanchions are open, as shown in Fig. 1. When, however, an animal is in place between said bars 1 and 2, and said bar 2 is moved inward toward the vertical said loop 13 will be thrown up slightly by contact with the angular bearing 25 of said stop until said stop has passed beneath it when said loop 13 will drop from the raised position, shown in Fig. 1, to the lower position, indicated in Fig. 2, when the latch 20 will simultaneously be caused to engage the upper end of the stanchion bar 2, whereby said bar 2 is securely locked in place. Heretofore it has been common to use a gravity loop alone as a means of locking the pivotal stanchion bar in its closed position. By my construction, however, the pivotal stanchion bar is locked in its closed position solely by the action of the gravity latch 20, while said loop 13 serves the three-fold purpose of supporting the pivotal bar 2 against lateral movement as a guide for the upper end of said bar as it is being closed and as a means for throwing the latch 20 out of engagement with the upper end of the stanchion bar, when desirous to open the stanchion. The latch 20 is provided with two upwardly projecting lugs 20′ which are adapted, when said latch is raised to engage the respective vertical sides of the bar 16 above the stanchion, whereby they prevent the stanchion from turning as the pivotal stanchion bar 2 is passing beneath the latch.

Having thus described my invention what I claim as new and desire to secure by Letters Patent is,

1. In a cattle stanchion of the class described, the combination of a stanchion supporting frame, an upper and lower stanchion bracket pivotally connected with said frame, a pair of vertical stanchion bars, one rigidly connected at its respective ends with said upper and lower brackets and the other pivotally connected at its lower end with said lower bracket and slidably connected at its upper end with said upper bracket, a latch provided with a central lug having its contact bearing surface inclined inwardly and downwardly at an angle to the vertical and adapted to be raised by contact with and to engage the upper end of said pivotally supported stanchion bar a bar retaining loop pivotally connected to said bracket beneath said latch and adapted to guide and limit the outer movement of the stanchion bar when released from the latch and to serve as a lever for raising and disengaging said latch from the end of said stanchion bar when locked and a single bolt pivotally connecting said latch and loop to said upper bracket.

2. In a cattle stanchion of the class described, the combination of a stanchion supporting frame, an upper and lower stanchion bracket pivotally connected with said frame, a pair of vertical stanchion bars, one of said bars being adjustably secured at its respective ends to said brackets, the other stanchion bar being pivotally connected at its lower end with said lower bracket and slidably connected at its upper end with said upper bracket, a latch provided with a central lug having its contact bearing surface formed at an angle to the vertical and adapted to be raised by contact with and engage the upper end of said pivotally supported stanchion bar said latch being also provided with two upwardly extending lugs (20′) adapted when said latch is raised to engage the respective vertical sides of the upper bar of the stanchion supporting frame to prevent the stanchion from turning as the pivotal stanchion bar is passing beneath said latch and a bar retaining loop pivotally connected with said bracket beneath said latch and adapted to guide and limit the outer movement of the stanchion bar when released from the latch and to serve as a lever for raising and disengaging said latch from the end of said stanchion bar when locked.

In testimony whereof I affix my signature in the presence of two witnesses.

WILLIAM GUTENKUNST.

Witnesses:
JAS. B. ERWIN,
O. R. ERWIN.